United States Patent [19]
Cucheran et al.

[11] Patent Number: 5,385,285
[45] Date of Patent: Jan. 31, 1995

[54] VEHICLE ARTICLE CARRIER

[75] Inventors: John S. Cucheran, Lake Orion; Jeffrey M. Aftanas, Sterling Heights, both of Mich.

[73] Assignee: JAC Products, Inc., Ann Arbor, Mich.

[21] Appl. No.: 163,287

[22] Filed: Dec. 7, 1993

[51] Int. Cl.6 .................................................. B60R 9/00
[52] U.S. Cl. ..................................... 224/321; 224/315; 224/326
[58] Field of Search ......................... 224/315, 319-326

[56] References Cited

U.S. PATENT DOCUMENTS

| | | | |
|---|---|---|---|
| D. 310,196 | 8/1990 | Bott | D12/157 |
| D. 317,744 | 6/1991 | Bott | D12/157 |
| 2,659,319 | 11/1953 | Hermann | |
| 2,739,748 | 3/1956 | Hoover | |
| 3,545,660 | 12/1970 | Stephen | 224/321 |
| 3,554,416 | 1/1971 | Bott | |
| 4,099,658 | 7/1978 | Bott | |
| 4,213,593 | 7/1980 | Weik | |
| 4,278,376 | 7/1981 | Hunter | |
| 4,448,337 | 5/1984 | Cronce | 224/321 |
| 4,469,261 | 9/1984 | Stapleton et al. | 224/321 |
| 4,684,048 | 8/1987 | Bott | 224/326 |
| 4,754,905 | 7/1988 | Bott | 224/326 |
| 4,777,168 | 10/1989 | Bott | 224/321 |
| 4,899,917 | 2/1990 | Bott | 224/326 |
| 4,911,348 | 3/1990 | Rasor et al. | 224/321 |
| 4,967,945 | 11/1990 | Bott | 224/326 |
| 4,972,983 | 11/1990 | Bott | 224/326 |
| 4,982,886 | 1/1991 | Cucheran | 224/321 |
| 5,004,139 | 4/1991 | Storm et al. | 224/324 |
| 5,082,158 | 1/1992 | Bott | 224/321 |
| 5,104,019 | 4/1992 | Bott | 224/325 |
| 5,133,490 | 7/1992 | Cucheran | 224/321 |
| 5,143,267 | 9/1992 | Cucheran et al. | 224/321 |
| 5,158,425 | 10/1992 | Bott | 224/321 |
| 5,174,484 | 12/1992 | Bott | 224/321 |
| 5,190,198 | 3/1993 | Cucheran | 224/321 |
| 5,203,483 | 4/1993 | Cucheran | 224/321 |
| 5,232,138 | 8/1993 | Cucheran | 224/321 |
| 5,232,139 | 8/1993 | Cucheran | 224/324 |

FOREIGN PATENT DOCUMENTS 0037456 2/1981 Germany.
57-37044 3/1982 Japan.

*Primary Examiner*—J. Casimer Jacyna
*Attorney, Agent, or Firm*—Harness, Dickey & Pierce

[57] ABSTRACT

A vehicle article carrier including a spring loaded locking mechanism for lockably engaging a pair of bracket members of the carrier releasably to a pair of slats of the carrier. The locking mechanism of each bracket member generally includes a locking member disposed for rotational movement within its bracket member, a spring for biasing the locking member into a normally locked position relative to its associated slat, and an actuating member mounted for pivotal movement within its associated bracket member. The actuating member has a cam surface and an upper end portion of the locking member has a cam following surface. Movement of the actuating member from a closed position to an open position protruding outwardly of its bracket member causes the locking member to be rotated against the biasing force of the spring into an unlocked position relative to its slat. Movement of the actuating member into a closed position allows the spring to bias the locking member into locking engagement with its slat. In the preferred embodiment the actuating member includes a protruding portion which serves to help maintain the actuating member in its open position.

18 Claims, 2 Drawing Sheets

VEHICLE ARTICLE CARRIER

BACKGROUND OF THE INVENTION

TECHNICAL FIELD

The present invention relates to vehicle article carrier systems, and more particularly to a vehicle article carrier system having a locking mechanism which is biased into a normally locked position, and which may be unlocked by a relatively short, longitudinal movement of an actuating member associated therewith.

DISCUSSION

Vehicle article carriers are used in a wide variety of applications to transport cargo above an exterior body surface of a vehicle such as an automobile. Such vehicle article carriers often include a pair of slats positioned parallel to one another on the roof of a vehicle and a pair of cross bars extending transversely between the slats. Most typically, the cross bars are used to support the cargo being transported above the roof of the vehicle to thereby prevent scratching or scuffing of the paint on the roof.

Some vehicle article carrier systems provide for longitudinal adjustment along the slats of one or more of the cross bars. Accordingly, cargo of widely varying shapes and sizes may be transported because of the adjustability of one or more cross bars of the article carrier. Article carriers which provide for some form of longitudinal adjustment of one or more cross bars often further include some form of locking mechanism associated with one of the cross bars for releasably securing the cross bar at a desired location along the slats.

Since motor vehicles are often used in a wide variety of climates and are subject to the elements (i.e., sleet, snow, ice), it is imperative that the locking mechanism for a vehicle article carrier be easy to operate without the use of any special tools, manually easy to engage and disengage, and of a construction which is economical and which does not add significantly to the overall cost of the vehicle article carrier system.

Accordingly, it is a principal object of the present invention to provide a vehicle article carrier which includes a locking mechanism for holding a cross bar of the carrier at a desired position along a pair of slats of the carrier.

It is yet another object of the present invention to provide a vehicle article carrier having a locking mechanism which allows a user to unlock an associated cross bar from a pair of slats without the use of any special tools, and which further allows the cross bar to be positively secured to the slats without the use of any external tool.

It is yet another object of the present invention to provide a locking mechanism for a vehicle article carrier which permits a cross bar associated with the locking mechanism to be released manually with a single, relatively short movement of an actuating member, and similarly locked with a correspondingly short movement of the actuating member.

It is yet another object of the present invention to provide a locking mechanism for a vehicle article carrier which assumes a normally locked position whenever an actuating member of the locking mechanism is not being manually engaged by the user.

It is still another object of the present invention to provide a locking mechanism for a vehicle article carrier which is constructed relatively inexpensively from a relatively small number of component parts.

SUMMARY OF THE INVENTION

The above and other objects are provided by a locking mechanism for a vehicle article carrier in accordance with a preferred embodiment of the present invention. The vehicle article carrier system with which the locking mechanism is used includes a pair of slats positioned generally parallel along an outer body vehicle surface such as a roof of a motor vehicle. At least one cross bar is positioned transversely of each of the slats and extends between each of the slats. The cross par includes a bracket member at each end thereof which allows the cross bar to be supported above the outer body surface of the vehicle on the slats, and to be adjusted longitudinally along the slats to a desired position.

A locking mechanism of the present invention is disposed within each bracket member disposed at the opposite ends of the cross bar. Each locking mechanism generally includes a locking member, means for biasing the locking member into locking engagement with a portion of its associated slat, and an actuating member which may be grasped and moved manually between open and closed positions to thereby cause the locking member to be concurrently moved between unlocked and locked positions, respectively. In the preferred embodiment the locking member includes a locking shoulder portion, a central portion and an upper end portion. The central portion includes a bore through which extends a pivot rod. The pivot rod enables the locking member to move rotationally thereabout. The actuating member includes a graspable handle portion and a top portion. The top portion includes a bore through which an upper pivot pin extends to thereby permit the actuating member to be moved rotatably about the upper pivot pin. The top portion of the actuating member further preferably includes a cam surface which is disposed abuttingly against the upper end portion of the locking member. In the preferred embodiment the biasing means takes the form of a spring which is arranged to provide a constant biasing force to the locking member to constantly urge the locking member into locking engagement with its associated slat.

In operation, when the graspable handle portion of the actuating member is moved rotationally into an open position the cam surface thereof causes the upper end portion of the locking member to move rotationally about the pivot rod, thereby causing the locking member to be urged out of locking engagement into an unlocked position. When the actuating member is moved from the open position to its closed position the cam surface allows the upper end portion to move in an opposite rotational direction about the pivot rod, thereby allowing the spring to urge the locking member back into locking engagement with its associated slat.

In the preferred embodiment the cam surface includes at least one protruding portion and the upper end portion of the locking member includes a recess portion. When the actuating member is moved rotationally from its fully closed position its fully open position, the protruding portion engages recess which helps to hold the actuating member in the fully open position while the locking member is in its unlocked position. In this manner the cross bar associated with the locking mechanism may be moved slidably along the slats without the need for the user to hold the actuating member in the open position to maintain the locking member in the unlocked position.

The locking mechanism of the present invention allows a bracket member to be quickly and easily locked and unlocked relative to its associated slat without the need for any special tools for accomplishing the locking or unlocking action. Moreover, both the locking and unlocking action are accomplished by single, relatively short rotational movement of an actuating member between open and closed positions. Additionally, the actuating member need not be held in the open position maintain the locking member of the mechanism in its unlocked position. Accordingly, longitudinal adjustment of the cross bar is made significantly easier and can quickly and easily be accomplished by a single person.

The locking mechanism of the present invention provides the added benefit that the locking action takes place within a bracket member and a slat, thereby helping to shield most of the moving components of the mechanism from the elements. This further helps to ensure smooth and easy operation of the actuating member of the mechanism even at times when the bracket member is exposed to rain, sleet, snow, etc. which might otherwise interfere with the smooth operation of the mechanism.

BRIEF DESCRIPTION OF THE DRAWINGS

The various advantages of the present invention will become apparent to one skilled in the art by reading the following specification and subjoined claims and by referencing the following drawings in which:

FIG. 3 is a fragmentary perspective view of the locking mechanism of the present invention showing the various component parts thereof in elevation;

FIG. 4 is a sectional view of the bracket member of FIG. 2 taken in accordance with section line 4—4 in FIG. 2; and FIG. 5 is a simplified view of the locking mechanism similar to that shown in FIG. 2, and further showing the orientation of the actuating member and locking member as the actuating member is moved between fully closed and fully open positions, and further showing the range of travel in terms of degrees of the actuating member.

DETAILED DESCRIPTION OF THE PREFERRED EMBODIMENTS

Figure 1:
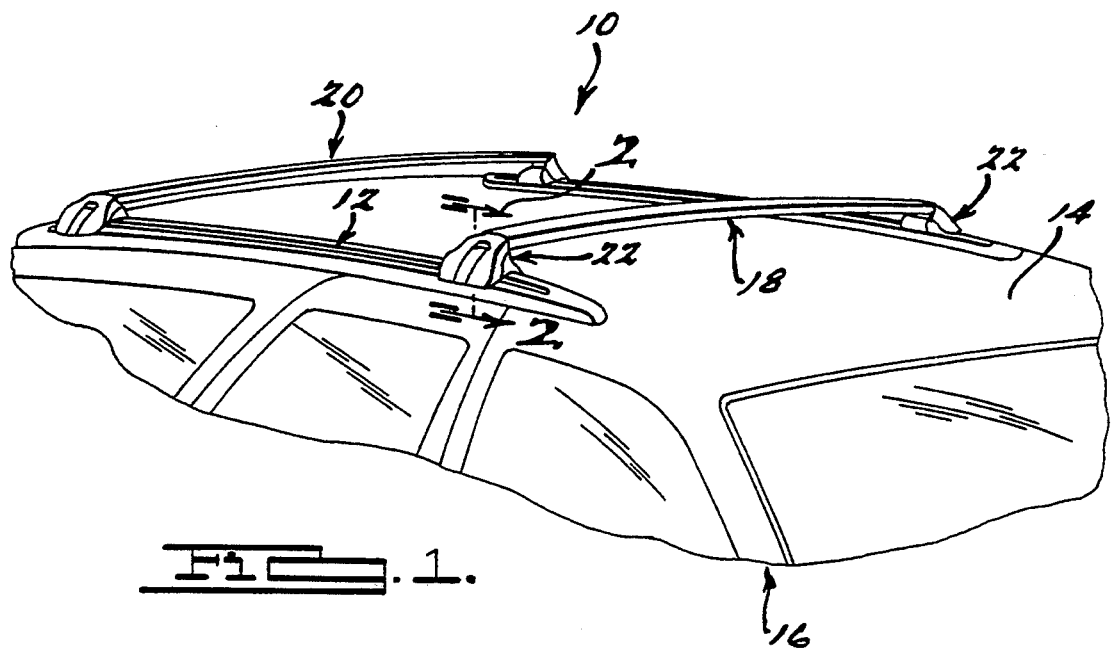
FIG. 1 is an elevational perspective view of a vehicle article carrier in accordance with the present invention showing the vehicle article carrier secured to an outer body surface of a vehicle such as an automobile.

Referring to FIG. 1, there is shown a vehicle article carrier 10 in accordance with a preferred embodiment of the present invention. The vehicle article carrier 10 generally comprises a pair of elongated slats 12 disposed parallel to one another and extending along the major longitudinal length of the roof 14 of a vehicle 16. It should be appreciated, immediately, however, that while the vehicle article carrier 10 particularly well adapted to be disposed on the roof 14 of the vehicle 16, the carrier 10 could just as easily be disposed on a rear deck lid (i.e., trunk lid) of a vehicle provided slats having a suitable length are also provided.

The vehicle article 10 further generally includes at least one adjustable cross bar 18 and a second cross bar which may be either fixed or adjustable in a manner identical that of cross bar 18. The cross bar 18 includes bracket members 22 fixedly secured at its outermost ends. The bracket members allow the cross bar 18 to be slidably longitudinally positioned along the slats 12, as will be explained more fully momentarily, to thus enable cargo having widely varying shapes and sized to be transported by the carrier 10. It will also be appreciated that if the rear cross bar 20 is desired to be adjustable, then it too will include brackets identical to brackets 22 on the front cross bar 18. If the rear cross bar 20 is intended to be fixedly secured (i.e., not adjustable along the slats 12) then its bracket members may include a well known variety of securing mechanisms for fixedly securing the rear cross bar 20 so as not to permit longitudinal movement.

Figure 2:
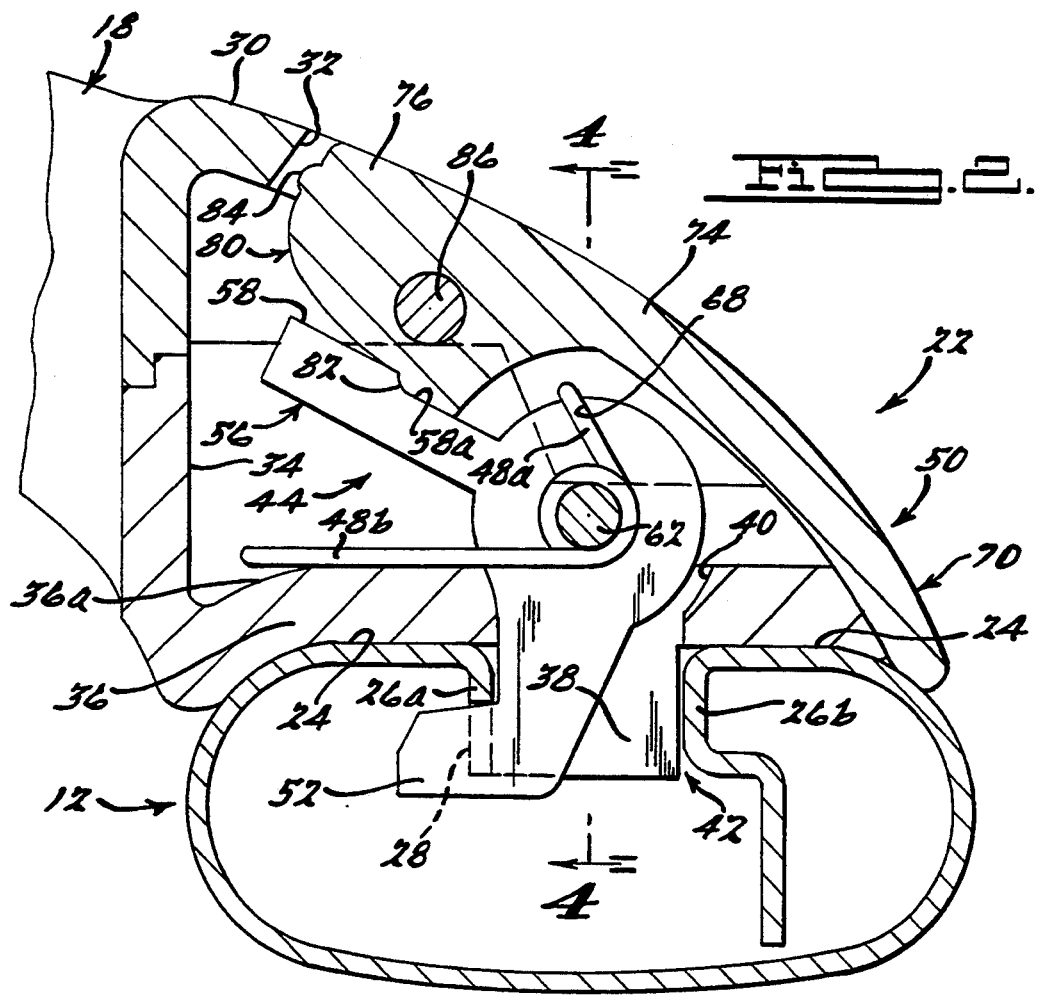
FIG. 2 is a cross sectional view of one bracket member of the vehicle article carrier taken in accordance with section line 2—2 in FIG. 1.

Referring to FIGS. 2 and 3, each of the slats 12 includes upper article supporting surfaces 24 upon which articles and other cargo may be placed, and further upon which each of the bracket members 22 are slidably disposed. Each slat 12 further includes a pair of downwardly depending shoulder portions 26a and 26b with shoulder portion 26a including a plurality of notches 28 formed therein and spaced apart longitudinally along the length of its associated slat 12. It will be appreciated that the shape of the shoulder portions 26a and 26b could vary significantly from that shown in the Figures, the important point being that at least some means is provided by which positive engagement can be made with some form of locking element. It will also be appreciated that while notches 28 are the preferred form of openings to permit locking engagement of the bracket member 22 at specific positions along the slats 12, notches 28 could easily be replaced by semi-circular shaped notches, or notches formed in a wide variety of other shapes, or even apertures formed in the shoulder portion 26a.

With reference to FIGS. 1 and 2, each bracket member includes a slightly curved outer wall portion 30 having a recess 32, an inner wall portion 34 and a bottom wall portion 36. The bottom wall portion 36 includes a pair of foot members 38 (only one of which is visible in FIG. 2; both of which are visible in FIG. 4) and an opening 40 in the bottom wall portion 36. The foot members 38 are of a width which allows them to be placed within a channel 42 formed between the shoulder portions 26a and 26b. The foot members 38 allow the bracket member 22 to be moved slidably, generally linearly, along the length of the slat 22 when in the unlocked position.

With further reference to FIGS. 2-4, each bracket member 12 includes a locking mechanism generally designated by reference numeral 44. The locking mechanism 44 generally includes a locking member 46, a biasing member in the form of a coiled spring 48 and an actuating member 50. The locking member 46 includes a locking shoulder portion 52, a central portion 4 and an upper end portion 56 having a cam following surface 58. The cam following surface 58 further includes a recessed portion 58a (best seen in FIGS. 2, 3 and 5). The central portion further includes a bore 60 through which is disposed a pivot rod 62. The pivot rod 62 is supported within the bracket member 22 in apertures 64 (FIG. 4) formed in a pair of upwardly extending wall portions 66 in the interior of the bracket member 22. The central portion 54 of the locking member 46 further includes spring abutting shoulder portions 68 which portions 48a (only one of which is visible in FIG. 3) of the spring 48 abuttingly engage. The spring 48 is further positioned over the pivot rod 62 such that portions 48b extend substantially transversely from portions 48a when the locking member 46 is in its locked position, and a portion 48c extends over the central portion 54. Portions 48b of the spring 48 are adapted to rest on an inside surface 36a (FIG. 2) of the bottom wall portion 36.

With further reference to FIGS. 2-4, the actuating member 50 includes a graspable handle portion 70 having a curve inner surface 72 adapted to extend around the central portion 54 of the locking member 46, a slightly curved outer surface 74, and a top portion 76. The top portion 76 includes an aperture 78 and a cam surface 80. The cam surface 80 includes a first protruding portion 82 and a second protruding portion 84. The actuating member 50 is disposed for rotational movement about an upper pivot pin 86 which is itself supported in apertures 88 in the upwardly extending wall portions 66 (FIG. 4). The actuating member 50 and locking member 46 are further positioned such that the cam surface 80 abuttingly engages the cam following surface 58 at all times.

With reference now to FIGS. 2-5, the operation of the locking mechanism 44 will now be described. Initially, when the actuating member 50 is in a closed position, such as that shown in FIG. 2, the spring 48 provides a biasing force to urge the spring abutting shoulder portion 68 in a clockwise direction as viewed in FIG. 2, thereby urging the locking shoulder portion 52 of the locking member 46 into engagement with one of the notches 28 when the locking mechanism 46 is aligned with one of the notches 28. The biasing force of the spring 48, coupled with the engagement of the first protruding portion 82 in the recessed portion 58a of the upper end portion 56, causes the actuating member 50 to be constantly maintained in a closed position. When in a closed position the curved outer surface 74 of the actuating member 50 is generally flush with the outer surface 30 of the bracket member 22. Accordingly, the appearance of a single, generally smooth uniform surface from the slat 12 to the front cross bar 18 is provided. The generally continuous curvature further provides the advantage of being more aerodynamically efficient than would otherwise be the case if the actuating member 50 was caused to protrude somewhat when in the locked position.

When the graspable handle portion 70 of the actuating member 50 is moved into its fully open position, as shown in FIG. 5, the cam surface 80 urges the cam following surface in a counter-clockwise direction, as viewed from the drawing FIG. 5, against the biasing force of the spring 48. When the graspable handle portion 70 is extending almost perpendicular relative to the article supporting surfaces 24 of the slat 12, the second protruding portion 84 engages the recessed portion 58a, thus helping the actuating member 50 to be held in its fully opened position. At this point the locking shoulder portion of the locking member 46 has been rotated such that it clears the notch 28 with which it was previously engaged. The bracket member 22 may then be moved slidably along its respective slat 12 and the cross bar 18 associated therewith adjustably positioned along the slat 12. It will be appreciated that before longitudinal adjustment of the cross bar can be made that each of the bracket members 22 of the front cross bar 18 will De required to be in the open position.

The locking mechanism 44 of the vehicle article carrier 10 thus provides a means by which the bracket members 22 may De locked and unlocked from their respective slats 12 by a simple, relatively short movement of the actuating member 50. Since the components of the locking mechanism 44 are disposed within the bracket member 22 the components are relatively well protected from the elements. Moreover, since the spring 48 and locking member 46 are configured such that the locking member 46 is urged into a normally closed position, the mechanism 44 provides a very positive locking action regardless of bumps, jolts or other vibration which the vehicle may experience during travel. The various components of the vehicle article carrier 10, and particularly the locking mechanism 44, are constructed of widely available materials such as metal, aluminum and plastic in accordance with conventional manufacturing techniques. The bracket members 22 may each be constructed so as to be assembled in two or more pieces, as indicated by connecting step 90 n FIG. 5.

With specific reference to FIG. 5, it can be seen that the arc of travel 92 of the actuating member 50 from is fully closed position to its fully open position comprises an arc of about 100 degrees, and more preferably of about 110 degrees. It will be appreciated, however, that this degree of arc could be shortened or lengthened depending upon the shape of the cam surface 80, or the shape of the cam following surface 58.

The generally in-line movement of the actuating member 50 between its closed an open positions further provides a means by which the bracket member 22 can be quickly and easily manually unlocked and locked without the need for special tools or disassembly of the bracket member 22, or any portion of it. An additional advantage is the relatively minimal force that need be exerted on the actuating member 50 to lift the member 50 into its open position. Moreover, since the graspable handle portion 70 has a shape which is easily grabbed with one or more fingers, the bracket member 22 can be locked and unlocked even while wearing gloves.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting objects above an external surface of a vehicle, said vehicle article carrier comprising:

at least one slat extending longitudinally along said exterior body surface;

a cross bar adapted to be supported elevationally above said exterior body surface;

bracket means for supporting at least one end of said cross bar above said exterior body surface on said slat, said bracket means including:

a pivot rod;

an inner bottom wall;

locking means movable rotatably into a locked position for securing said bracket means fixedly relative to said slat, said locking means further being rotatable into an unlocked position wherein said bracket means can be moved slidably longitudinally along said slat to allow adjustable positioning of said cross bar along the length of said slat, said locking means further including a longitudinally extending bore through which said pivot rod extends to enable rotational movement of said locking means;

actuating means for urging said locking means rotatably into said locked and said unlocked positions; and a spring disposed over said pivot rod which engages said inner bottom wall and a portion of said locking means for biasing said locking means into said locked position such that said locking means is biased into a normally locked position.

2. The vehicle article carrier of claim 1, wherein said actuating means is movable pivotally relative to said bracket means.

3. The vehicle article carrier of claim 1, wherein said locking means includes a spring abutting shoulder portion; and wherein said spring abuts said spring abutting shoulder portion to thereby urge said locking means into said normally locked position.

4. The vehicle article carrier of claim 1, wherein said actuating means comprises a graspable handle portion and a cam surface;

wherein said locking means comprises an upper end portion which abuttingly contacts said cam surface as said graspable handle portion is moved rotatably between said open and closed positions;

wherein said cam surface causes said upper end portion of said locking means to move rotatably to thereby cause sad locking means to be urged into said unlocked position when said graspable handle portion is moved manually into said open position; and wherein said cam surface allows said upper end portion of said locking means to move pivotally in a second rotational direction when said graspable handle portion is moved to said closed position, to thereby cause said locking means to assume said locked position.

5. The apparatus of claim 4, wherein said cam surface includes a first protruding portion and a second protruding portion;

and wherein said upper end portion of said locking means includes a recessed portion; and and wherein said first protruding portion is adapted to engage said recessed portion when said actuating means is in said closed position, and wherein said second protruding portion engages said recessed portion when said actuating means is moved into said open position, to thereby help maintain said actuating means in said open position.

6. The vehicle article carrier of claim 5, wherein said actuating means includes an outer surface which is shaded to conform to an outer surface of said bracket means when said actuating means is in said closed position.

7. The apparatus of claim 1, wherein said actuating means is adapted to rotate between a closed position and an open position, and wherein said open and closed positions are defined by an arc having a range of about 100 degrees.

8. A vehicle article carrier for supporting cargo above a roof of a vehicle, said vehicle article carrier comprising:

a pair of slats disposed parallel to one another and extending longitudinally along a major length of said roof of said vehicle;

each one of said slats having a channel formed therein with at least one inwardly extending lip portion, said lip portion including a plurality of spaced apart openings;

a cross bar adapted to be positioned transversely of each of the slats for supporting said cargo above said roof;

a pair of bracket members disposed one at each end of said cross bar for permitting said cross bar to be slidably, longitudinally positioned along said slats, each said bracket member including:

a locking member movable rotatably between a locked position and an unlocked position, said locking member engaging a selected one of said openings when in said locked position to thereby prevent longitudinal movement of its respective said bracket member along its respective said slat, and for permitting longitudinal movement and adjustment of its respective said bracket member and said cross bar at various positions along its respective said slat when in said unlocked position;

a spring associated with said locking member for biasing said locking member continuously toward said locked position such that said locking member tends to normally assume said locked position when aligned with at least one of said openings;

an actuating member movable pivotally relative to its said respective bracket member between a closed position and an open position;

means for pivotally mounting said actuating member within its respective said bracket member;

said actuating member including a cam surface and said locking member including an upper end portion having a cam following surface adapted to abuttingly engage said cam surface;

said actuating member causing said upper end portion of said locking member to be moved rotatably from said locked position to said unlocked position as said actuating member is moved into said open position;

said cam surface of said actuating member causing said locking member to move into said locked position when said actuating member is moved into said closed position.

9. The vehicle article carrier of claim 8, wherein said cam surface of said actuating member comprises a first protruding portion, and wherein said upper end portion of said locking member includes a recessed portion, said first protruding portion engaging said recessed portion when said actuating member is in said closed position.

10. The vehicle article carrier of claim 9, wherein said cam surface of said actuating member includes a second protruding portion for engaging said recessed portion in said locking member when said actuating member is moved into said open position, to thereby help maintain said actuating member in said open position.

11. The vehicle article carrier of claim 8, wherein each bracket member further comprises foot means protruding outwardly from a lower surface of said bracket member into said channel in its associated said slat to help guide said bracket member longitudinally along said slat when said bracket member is being repositioned longitudinally along said slat.

12. The vehicle article carrier of claim 8, wherein said spring biases said actuating member normally into said closed position.

13. A vehicle article carrier for supporting cargo above an external vehicle body surface such as a roof, said vehicle article carrier comprising:

a pair of slats positioned parallel to one another and extending longitudinally along a major length of said exterior vehicle body surface, each one of said slats including a pair of upper article supporting surfaces, at least one inwardly extending lip portion having a plurality of notches formed therein and spaced apart longitudinally along the length of said lip portion;

a cross bar positioned transversely of each of said slats for supporting cargo elevationally above said exterior vehicle body surface;

a pair of bracket members fixedly disposed at opposite ends of said cross bar and adapted to rest slidably upon said upper article supporting surfaces of said slats to thereby permit said cross bar to be slidably longitudinally positioned along said slats to a specific, desired location;

each one of said bracket members including:

a generally curved outer surface having a recess formed therein, and a bottom wall portion having at least one foot member protruding outwardly therefrom;

a locking member, said locking member including an upper end portion, a locking shoulder portion, and a central portion having a bore extending therethrough;

a pivot rod extending through said bore, said pivot rod thereby enabling said locking member to be moved rotatably between a locked and an unlocked position, when in said locked position said locking shoulder portion engages one of said notches in said lip portion and when in said unlocked position said locking member is positioned clear of said notch to permit said locking member to be moved longitudinally along said lip portion;

a spring disposed about said pivot rod for engaging a portion of said bottom wall portion and a spring abutting shoulder portion of said locking member to cause said locking member to be urged normally into said locked position;

an actuating member having a graspable handle portion, a top portion having a bore, and a cam surface;

an upper pivot pin extending through said bore and said top portion of said actuating member for disposing said actuating member for pivotal movement about said upper pivot pin;

said actuating being movable between an open position and a closed position, said cam surface of said actuating member causing said upper end portion of said locking member to be moved rotatably in a first direction as said actuating member is moved into said open position, thereby causing said locking member to be urged into said unlocked position;

said spring causing said locking shoulder portion of said locking member to be moved into said locked position with said notch as said graspable handle portion of said actuating member is moved into said closed position.

14. The vehicle article carrier of claim 13, wherein said cam surface includes a first protruding portion and a second protruding portion, and wherein said upper end portion of said locking member includes a recess portion, said first protruding portion engaging said recess in said upper end portion of said locking member when said actuating member is moved into said closed position; and said second protruding portion of said cam surface engaging said recess when said graspable handle portion of said actuating member is moved into said open position, to thereby help maintain said actuating member in said open position against the biasing force of said spring.

15. The vehicle article carrier of claim 13, wherein said actuating member is movable rotationally in an arc having a range of about 100 degrees.

16. The apparatus of claim 15, wherein when said actuating member is in said closed position said curved outer surface of said actuating member is relatively flush with said outer surface of said bracket member.

17. A vehicle article carrier for supporting objects above an external surface of a vehicle, said vehicle article carrier comprising:

at least one slat extending longitudinally along said exterior body surface;

a cross bar adapted to be supported elevationally above said exterior body surface;

a bracket member for supporting one end of said cross bar above said exterior body surface and being releasably and adjustably securable to said one slat;

said bracket member including:

a pivot pin;

an actuating member having a bore through which said pivot pin extends to thereby permit said actuating member to be moved pivotally about said pivot pin, said actuating member further including a manually graspable portion and a camming portion;

a pivot rod;

a locking member having a bore through which said pivot rod extends such that said locking member is pivotally moveable about said pivot rod;

said locking member further including a portion adapted to cammingly engage said camming portion of said actuating member such that pivotal movement of said actuating member results in a corresponding pivotal movement of said locking member; and a spring associated with one of said actuating and locking members adapted to bias said locking member into a normally locked position relative to said one slat, and wherein movement of said actuating member into an unlocked position causes said locking member to be urged out of locking engagement with said one slat against said biasing force provided by said spring, to thereby permit said bracket member and said cross bar to be adjustably positioned longitudinally along said one slat.

18. The vehicle article carrier of claim 17, wherein said spring has a first end adapted to abuttingly engage a portion of an interior surface of said bracket member, and a second end adapted to engage a portion of locking member to thereby bias said locking member into said normally locked position relative to said one slat.

* * * * *

UNITED STATES PATENT AND TRADEMARK OFFICE
CERTIFICATE OF CORRECTION

PATENT NO. : 5,385,285

DATED : Jan. 31, 1995

INVENTOR(S) : John S. Cucheran and Jeffrey M. Aftanas

It is certified that error appears in the above-indentified patent and that said Letters Patent is hereby corrected as shown below:

Title Page, References Cited, U.S. Patent Documents, 4,777,168 (I.D.S. filed 3-4-94), should be --4,877,168--;

Col. 2, Line 63, after "engages" insert --the--;

Col. 3, Line 3, after "invention" insert --thus--;

Col. 3, Line 11, after "position" insert --to--;

Col. 3, Line 64, after "carrier 10" insert --is--;

Col. 4, Line 1, after "article" insert --carrier--;

Col. 4, Line 2, after "bar" insert --20--;

Col. 4, Line 4, after "identical" insert --to--;

Col. 4, Line 51, "slat 22" should be --slat 12--;

Col. 4, Line 59, "portion4" should be --portion 54--;

UNITED STATES PATENT AND TRADEMARK OFFICE
CERTIFICATE OF CORRECTION

PATENT NO. : 5,385,285

DATED : Jan. 31, 1995

INVENTOR(S) : John S. Cucheran and Jeffrey M. Aftanas

It is certified that error appears in the above-indentified patent and that said Letters Patent is hereby corrected as shown below:

Col. 5, Line 55, after "drawing" insert --of--;

Col. 5, Line 62, after "portion" insert --52--;

Col. 6, Line 1, "De" should be --be--;

Col. 6, Line 5, "De" should be --be--;

Col. 6, Line 23, "n" should be --in--;

Col. 6, Line 25, "is" should be --its--;

Col. 6, Line 33, "an" should be --and--;

Col. 9, Line 58, Claim 13, after "actuating" insert --member--.

Signed and Sealed this

Thirtieth Day of January, 1996

Attest:

BRUCE LEHMAN

*Attesting Officer*  *Commissioner of Patents and Trademarks*